US012006748B2

(12) United States Patent
Reich

(10) Patent No.: US 12,006,748 B2
(45) Date of Patent: Jun. 11, 2024

(54) MEANS FOR SECURING AGAINST OPERATING ERRORS FOR LEAVES OF A WINDOW OR DOOR THAT CAN BE SLID TOGETHER

(71) Applicant: Roto Frank Fenster- und Tuertechnologie GmbH, Leinfelden-Echterdingen (DE)

(72) Inventor: Winfried Reich, Berglen (DE)

(73) Assignee: Roto Frank Fenster- und Tuertechnologie GmbH, Leinfelden-Echterdingen (DE)

( * ) Notice: Subject to any disclaimer, the term of this patent is extended or adjusted under 35 U.S.C. 154(b) by 883 days.

(21) Appl. No.: 16/971,943

(22) PCT Filed: Apr. 25, 2019

(86) PCT No.: PCT/EP2019/060559
§ 371 (c)(1),
(2) Date: Aug. 21, 2020

(87) PCT Pub. No.: WO2019/211147
PCT Pub. Date: Nov. 7, 2019

(65) Prior Publication Data

US 2020/0392776 A1 Dec. 17, 2020

(30) Foreign Application Priority Data

May 3, 2018 (DE) ..................... 10 2018 110 603.3

(51) Int. Cl.
*E05D 15/56* (2006.01)
*E05B 65/08* (2006.01)
(Continued)

(52) U.S. Cl.
CPC .......... *E05D 15/56* (2013.01); *E05B 65/0876* (2013.01); *E05C 7/045* (2013.01);
(Continued)

(58) Field of Classification Search
CPC . E05D 15/56; E05D 15/0604; E05D 15/0665; E05B 65/0876; E05C 7/045;
(Continued)

(56) References Cited

U.S. PATENT DOCUMENTS 5,704,661 A * 1/1998 Takimoto .............. E05C 19/028 292/162
6,270,129 B1 * 8/2001 Prevot ................... E05B 65/087 292/300
(Continued)

FOREIGN PATENT DOCUMENTS

CN 1239753 A 12/1999
CN 101068997 A 11/2007
(Continued)

OTHER PUBLICATIONS

Preliminary Report on Patentability for PCT/EP2019/060559 dated Jul. 24, 2019 with English translation dated Nov. 12, 2020.
(Continued)

*Primary Examiner* — Kristina R Fulton
*Assistant Examiner* — James Edward Ignaczewski
(74) *Attorney, Agent, or Firm* — Collard & Roe, P.C.

(57) ABSTRACT

A fitting assembly has a device for securing against operating errors that has a first protrusion which can be moved relative to a second protrusion by means of a first operating rod assembly. A buffer can be provided between the end sides of the first protrusion and the second protrusion. The first protrusion can be a cylinder and/or the second protrusion can extend in an elongated manner. The fitting assembly can have an anti-lifting device with a third protrusion which prevents a lifting of the first leaf. The fitting assembly has multiple carriages and multiple sliders in order to position leaves of the window or the door into their slide position in parallel with the main plane of the window or the door. In
(Continued)

the blocking position, the leaves can be pressed against a fixed frame of the window or the door via the fitting assembly with multiple carriages and multiple sliders, in order to reliably seal the window or the door.

15 Claims, 5 Drawing Sheets

(51) Int. Cl.
*E05C 7/04* (2006.01)
*E05D 15/06* (2006.01)
*E05F 17/00* (2006.01)

(52) U.S. Cl.
CPC ........ *E05D 15/0604* (2013.01); *E05F 17/004* (2013.01); *E05D 15/0665* (2013.01); *E05F 2017/007* (2013.01); *E05Y 2201/412* (2013.01); *E05Y 2900/132* (2013.01); *E05Y 2900/148* (2013.01)

(58) Field of Classification Search
CPC .............. E05F 17/004; E05F 2017/007; E05Y 2201/412; E05Y 2900/132; E05Y 2900/148
USPC .......................................................... 292/175
See application file for complete search history.

(56) References Cited

U.S. PATENT DOCUMENTS

| | | | | | |
|---|---|---|---|---|---|
| 6,691,462 | B2 * | 2/2004 | Oestermann | E05D 15/1042 49/213 |
| 7,971,392 | B2 * | 7/2011 | Seo | E05D 15/565 49/221 |
| 10,287,804 | B2 * | 5/2019 | Chantler | E05C 9/1808 |

FOREIGN PATENT DOCUMENTS

| | | | | | |
|---|---|---|---|---|---|
| CN | 101240676 | A | | 8/2008 | |
| CN | 205502792 | U | | 8/2016 | |
| CN | 205976797 | U | | 2/2017 | |
| DE | 20003563 | U1 | | 4/2000 | |
| DE | 102012200430 | A1 | | 7/2013 | |
| EP | 2860333 | A1 | * | 4/2015 | E05B 15/0006 |
| EP | 2860333 | A1 | | 4/2015 | |
| GR | 1007173 | B | | 1/2011 | |
| JP | H08210008 | A | | 8/1996 | |
| TW | 201519829 | A | * | 6/2015 | E05F 17/00 |
| WO | 2016083765 | A1 | | 6/2016 | |
| WO | WO-2017178221 | A1 | * | 10/2017 | E05B 15/0006 |

OTHER PUBLICATIONS

Chinese Search Report/Office Action dated Jul. 21, 2021 issued in the corresponding Chines Application Serial No. 201980007633.6 (with English translation of relevant parts).
Korean Office Action in Patent Application No. 10-2020-7023350 in Korean, with English translation, dated Jan. 8, 2023.
International Search Report dated dated Jul. 24, 2019 issued in PCT/EP2019/060559.
German Office Action dated Mar. 28, 2019 issued in corresponding German Application 10 2018 110 603.3 (with English translation of relevant parts).
Office Action Issued in Canadian Application No. 3,088,482, dated Jan. 18, 2024.

* cited by examiner

MEANS FOR SECURING AGAINST OPERATING ERRORS FOR LEAVES OF A WINDOW OR DOOR THAT CAN BE SLID TOGETHER

CROSS REFERENCE TO RELATED APPLICATIONS

This application is the National Stage of PCT/EP2019/060559 filed on Apr. 25, 2019, which claims priority under 35 U.S.C. § 119 of German Application No. 10 2018 110 603.3 filed on May 3, 2018, the disclosures of which are incorporated by reference. The international application under PCT article 21(2) was not published in English.

BACKGROUND OF THE INVENTION

The invention relates to a fitting assembly for two leaves of a window or door that can be slid towards one another, the fitting assembly comprising the following:

a) a first connecting-rod assembly for a first leaf, it being possible to move the first connecting-rod assembly into a sliding position, in which the first leaf can slide, and into a blocking position, in which the first leaf cannot slide;

b) a second connecting-rod assembly for a second leaf, it being possible to move the second connecting-rod assembly into a sliding position, in which the second leaf can slide, and into a blocking position, in which the second leaf cannot slide.

The invention also relates to a window or door comprising a fitting assembly of this kind.

It is known to provide fitting assemblies for a window or door in order to make it possible to move two leaves, which can each be slid open and closed, into a sliding position and a blocking position. When the window or door is closed, the end faces of the leaves are in contact.

In this case, the leaves may be designed such that a first leaf, generally called the "passive leaf," has to be closed first before a second leaf, generally called the "active leaf," can be closed. This is in particular the case because, in some embodiments, for opening, the two leaves have to be moved outwards from the fixed frame of the window or door from the blocking position into the sliding position. In this case, the end-face contours of the leaves are coordinated with one another such that the passive leaf cannot be moved outwards from the fixed frame while the active leaf is still in the blocking position. Alternatively or additionally, a non-movable locking striker can be provided on the passive leaf, which collides with a locking cam on the active leaf when the active leaf is closed first and the passive leaf is only closed after that. Lastly, the leaves may be designed such that damage to a seal on one of the leaves occurs if the active leaf is first closed and then the passive leaf is closed.

In known fitting assemblies, the user must therefore ensure that, when both leaves are open, the passive leaf is closed first and then the active leaf is closed. Some users are unfamiliar with this process, however, in particular in the case of windows or doors they do not own, in hotels or the like. Damage to windows or doors of this kind therefore occurs frequently due to operating errors.

The problem addressed by the invention is thus to provide a generic fitting assembly which prevents operating errors. Another problem addressed by the invention is to provide a window or door comprising a fitting assembly of this kind.

SUMMARY OF THE INVENTION

This problem is solved according to the invention by a fitting assembly according to claim 1 and by a window or door according to claim 9. The dependent claims set out preferred developments.

The problem according to the invention is thus solved by a fitting assembly for two movable leaves of a window or door, wherein, when slid together, the end faces of the leaves abut one another, and wherein the fitting assembly comprises the following:

a) a first connecting-rod assembly for a first leaf, it being possible to move the first connecting-rod assembly into a sliding position, in which the first leaf can slide, and into a blocking position, in which the first leaf cannot slide;

b) a second connecting-rod assembly for a second leaf, it being possible to move the second connecting-rod assembly into a sliding position, in which the second leaf can slide, and into a blocking position, in which the second leaf cannot slide;

wherein the fitting assembly comprises a first projection on the first connecting-rod assembly and the fitting assembly comprises a second projection that can be arranged on the second leaf, the first projection being able to pass by the second projection during the closing movement of the leaves in the blocking position of the first connecting-rod assembly and colliding with the second projection when the leaves are slid together in the sliding position of the connecting-rod assembly.

The terms "sliding position" and "blocking position" relate here to the possibility of the leaves being able to move relative to the fixed frame by means of the fitting assembly.

The collision of the first projection with the second projection when the passive leaf (first leaf) is in the sliding position and the end faces of both leaves are moved towards one another prevents the two leaves from being completely slid together. As a result, the user is made to bring the passive leaf into the blocking position first. The second projection can then move past the first projection and the active leaf (second leaf) can also be slid towards the passive leaf. As a result, operating errors and damage to the fitting assembly or the window or door can be reliably prevented.

In the sliding position of the first connecting-rod assembly, the first projection is located vertically, preferably at the level of the second projection, such that, when closing the leaves, the two projections meet at the end faces thereof, at least in part and in particular completely.

The fitting assembly is preferably designed such that the first projection is in an end position of the first connecting-rod assembly when in the blocking position. The first connecting-rod assembly then cannot be incorrectly actuated when the leaves are abutting one another, since the first projection could only move out of this end position, but this movement is blocked by the second projection. The invention therefore provides both an operating-error lock and a switching-sequence regulator.

The first projection preferably extends towards the second connecting-rod assembly. The second projection preferably extends towards the first connecting-rod assembly.

The first projection preferably engages over the second projection in the blocking position.

The first projection may be bolt-shaped. The second projection may be block-shaped.

The second projection may be movably arranged on the second leaf. For this purpose, the second projection may be arranged or formed on the second connecting-rod assembly. The second projection can, however, be preferably securely arranged on the second leaf, i.e. can be arranged so as to be immovable relative to the second leaf.

In a more preferred embodiment of the invention, the first projection and/or the second projection comprises an in particular resilient buffer on its end face at least in part in order to dampen the impact of the first projection on the second projection. At least one buffer may be in the form of a rubber buffer.

In order to secure the first leaf against lifting up and to provide additional intrusion protection, the fitting assembly may comprise a third projection, which can be mounted on the first leaf or the fixed frame. In the blocking position of the first leaf, the third projection may be supported on the second leaf and/or the fixed frame. If the third projection is mounted on the fixed frame, the third projection may be supported on the first leaf or on a part of the fitting assembly on the first leaf.

Particularly preferably, the third projection engages under the second projection here when the leaves are closed. More preferably, the second projection is arranged between the first projection and the third projection.

In order to fix the leaves to one another so as to protect against intrusion, the fitting assembly may comprise a locking cam that can be arranged on the second connecting-rod assembly and a locking striker that can be securely arranged on the first leaf for receiving the locking cam at least in part. In order to further increase the intrusion protection, the fitting assembly may comprise at least one additional locking striker that can be arranged on the first leaf and at least one corresponding additional locking cam on the second connecting-rod assembly. The additional locking striker is preferably designed to be the same as the locking striker. The additional locking cam is preferably designed to be the same as the locking cam.

The locking striker may comprise a protrusion and the locking cam may comprise a mushroom head for engaging under the protrusion in the blocking position of the second connecting-rod assembly, such that the leaves can no longer be pulled apart when the locking cam engages behind the protrusion. The locking cam is preferably retracted into the locking striker in parallel with the main plane of the window/door or of the fitting assembly, in particular in the vertical direction.

The fitting assembly may comprise at least one carriage and at least one slider, in order to move at least one leaf outwards for opening relative to the blocking position transversely to, in particular perpendicularly to, the main plane of the window or door. Here, the term “slider” describes a component for moving a leaf outwards at the top and also includes embodiments which are guided on the fixed frame by a roller or the like. Preferably, the fitting assembly comprises a plurality of carriages and a plurality of sliders, in order to move each of the two leaves further outwards in the sliding position than in the blocking position.

The problem according to the invention is also solved by a window or door comprising a fixed frame, two leaves that can be moved towards one another at the end faces, and a fitting assembly as described here and mounted on the leaves.

The second projection is preferably securely arranged on the second leaf.

If the fitting assembly comprises a third projection, said projection is preferably securely arranged on the first leaf.

The two leaves can be arranged such that they can only move in the main plane of the window or door.

The two leaves can each be raised for transferring from the blocking position into the sliding position.

Alternatively, the leaves can be designed to move outwards from the fixed frame and to be movable in parallel with the fixed frame. In this case, i) in the sliding position of the first connecting-rod assembly, the first leaf is or can be moved further outwards from the fixed frame than in the blocking position of the first connecting-rod assembly and ii) in the sliding position of the second connecting-rod assembly, the second leaf is or can be moved further outwards from the fixed frame than in the blocking position of the second connecting-rod assembly.

In this case, in the sliding position, the leaves are preferably each moved further outwards than in the blocking position by a distance of between 1 mm and 40 mm, in particular of between 2 mm and 30 mm, particularly preferably of between 4 mm and 20 mm.

The first leaf can be released for being moved outwards in the sliding position by means of the first connecting-rod assembly, such that a user additionally has to actuate the first leaf in order to transfer the first leaf into the sliding position. Alternatively, the first leaf can be moved into the sliding position by the first connecting-rod assembly by being forced to move outwards.

The second leaf can be released for being moved outwards in the sliding position by means of the second connecting-rod assembly, such that a user additionally has to actuate the second leaf in order to transfer the second leaf into the sliding position. Alternatively, the second leaf can be moved into the sliding position by the second connecting-rod assembly by being forced to move outwards.

To actuate the leaves, the fitting assembly may comprise a first handle coupled to the first connecting-rod assembly and a second handle coupled to the second connecting-rod assembly. Alternatively or additionally, the first leaf may comprise a first drive for actuating the first connecting-rod assembly. Alternatively or additionally, the second leaf may comprise a second drive for actuating the first connecting-rod assembly.

The fitting assembly may be designed for closing, slide-opening and tilt-opening the first leaf. Alternatively or additionally to tilt-opening the first leaf, the fitting assembly may be designed for the gap ventilation of the first leaf. Furthermore, the fitting assembly may be designed for closing, slide-opening and tilt-opening the second leaf. Alternatively or additionally to tilt-opening the second leaf, the fitting assembly may be designed for the gap ventilation of the second leaf.

Preferably, the first connecting-rod assembly, in particular the first handle, comprises only two switch positions, namely a first switch position in which the first connecting-rod assembly is in the blocking position and a second switch position in which the first connecting-rod assembly is in the sliding position.

The second connecting-rod assembly, in particular the second handle, comprises only two switch positions, namely a first switch position in which the second connecting-rod assembly is in the blocking position and a second switch position in which the second connecting-rod assembly is in the sliding position.

Further features and advantages of the invention will become clear from the description and the drawings. Likewise, the above-mentioned features and those set out in the following can each be used according to the invention in isolation or in any combination. The embodiments that are shown and described should not be understood to be definitive, but instead should be understood to set out the invention in an exemplary manner.

DETAILED DESCRIPTION OF THE INVENTION

Figure 1:
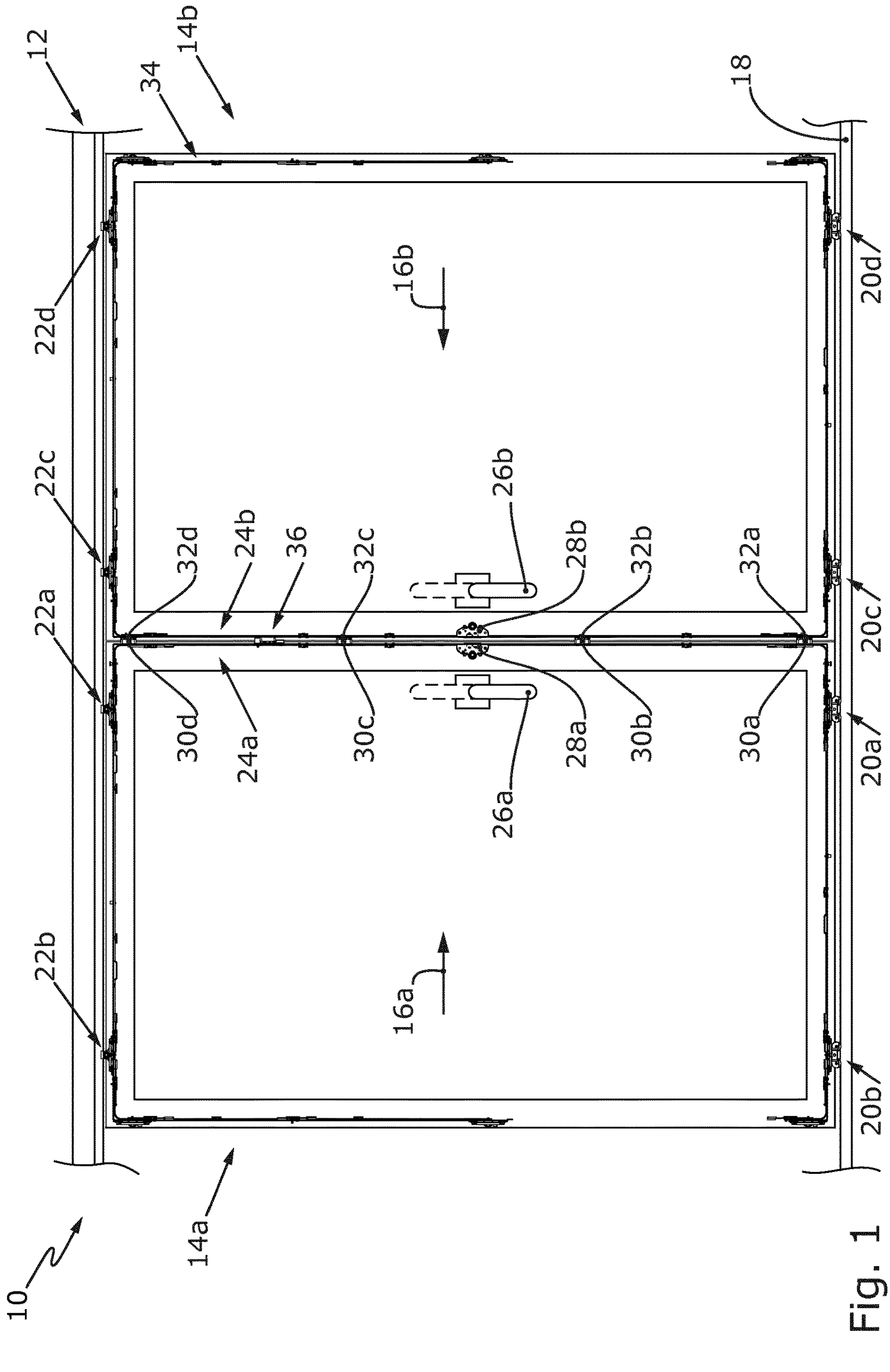
FIG. 1 is a side view of a schematic door comprising a fitting assembly which comprises means for securing against operating errors.

FIG. 1 shows a door 10 comprising a fixed frame 12 that is partially shown. The door 10 comprises a first leaf 14*a* and a second leaf 14*b*. The leaves 14*a*, 14*b* can be slid towards one another in the direction of the arrows 16*a*, 16*b* in order to close the door 10.

The fixed frame 12 comprises a running rail 18, on which the carriages 20*a*, 20*b*, 20*c*, 20*d* can travel in order to move the leaves 14*a*, 14*b*. The leaves 14*a*, 14*b* are supported on the upper face by means of sliders 22*a*, 22*b*, 22*c*, 22*d* on the fixed frame 12. The carriages 20*a*-20*d* and the sliders 22*a*-22*d* can be actuated by a first connecting-rod assembly 24*a* on the first leaf 14*a* and by a second connecting-rod assembly 24*b* on the second leaf 14*b*, in order to move the leaves 14*a*, 14*b* outwards from the fixed frame 12 in the sliding position.

The connecting-rod assemblies 24*a*, 24*b* can each be actuated by a first handle 26*a* and a second handle 26*b*, respectively, as shown schematically and offset in FIG. 1. The first handle 26*a* is coupled to the first connecting-rod assembly 24*a* by a first mechanism 28*a* of the first connecting-rod assembly 24*a*. The second handle 26*b* is coupled to the second connecting-rod assembly 24*b* by a second mechanism 28*b* of the second connecting-rod assembly 24*b*.

The leaves 14*a*, 14*b* are securely connected by end-face connections, which each comprise a locking striker 30*a*, 30*b*, 30*c*, 30*d*, a locking cam 32*a*, 32*b*, 32*c*, 32*d* engaging in each of the locking strikers (see also the view of the locking striker 30*a* and the locking cam 32*a* in the upper views in FIG. 6*a*-6*d*).

FIG. 1 shows the handles 26*a*, 26*b* with solid lines in the blocking position. The sliding position of the handles 26*a*, 26*b* is indicated by dashed lines. The handles 26*a*, 26*b* preferably have just two switch positions, such that the leaves 14*a*, 14*b* can be directly transferred from the blocking position into the sliding position, avoiding a tilted position or gap-opening position.

The leaves 14*a*, 14*b* can thus be actuated by a fitting assembly 34. The leaves 14*a*, 14*b*, which abut one another at the end faces when closed, i.e. are locked to one another, have to be closed in a certain sequence. The first leaf 14*a*, also called the "passive leaf," has to be closed before the second leaf 14*b*, also called the "active leaf," in order to prevent collisions in the region of the end faces of the leaves 14*a*, 14*b* or the locking strikers 30*a*-30*d* with the locking cams 32*a*-32*d*. This closing sequence is enforced by a means 36 for securing against operating errors, which is described in the following.

Figure 2C:
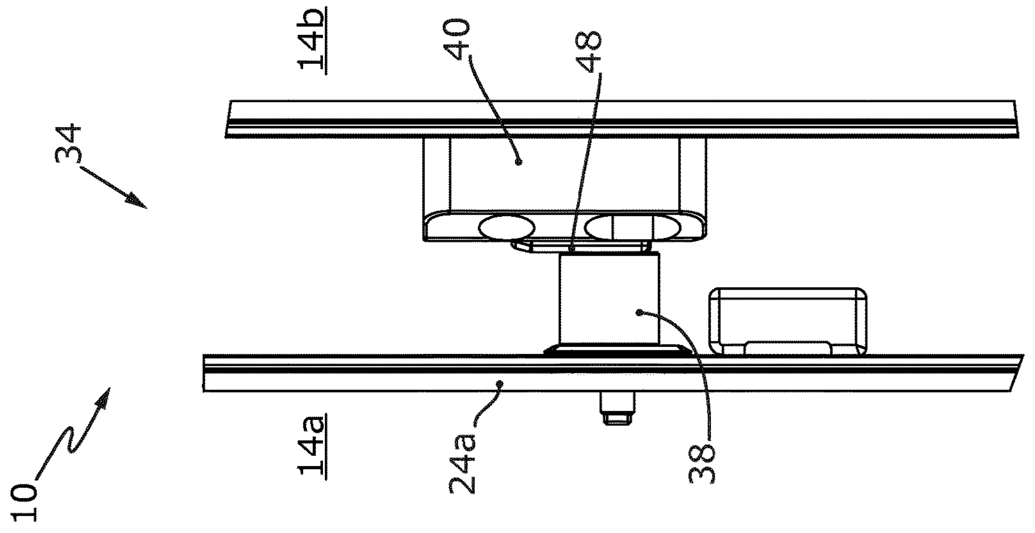
FIG. 2*c* shows the fitting assembly according to FIG. 2*a*, with the first leaf being in the sliding position.
Figure 2B:
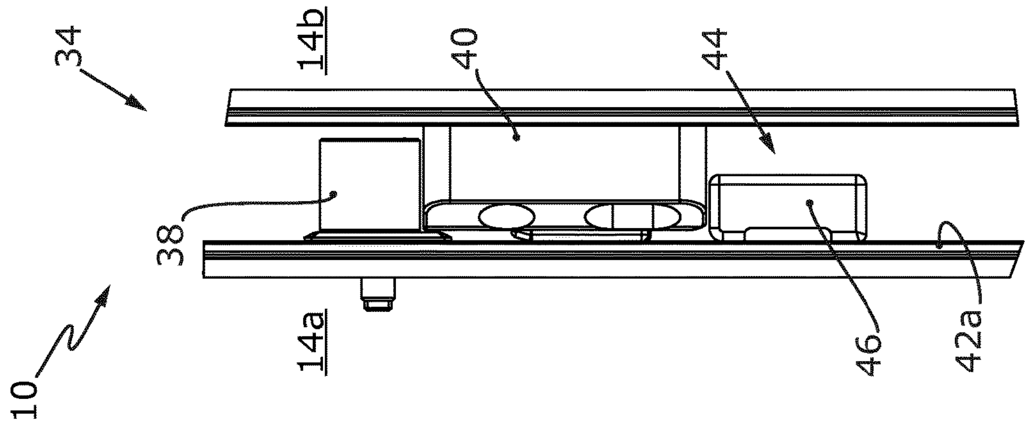
FIG. 2*b* shows the fitting assembly according to FIG. 2*a*, with the second leaf also being in the blocking position.
Figure 2A:
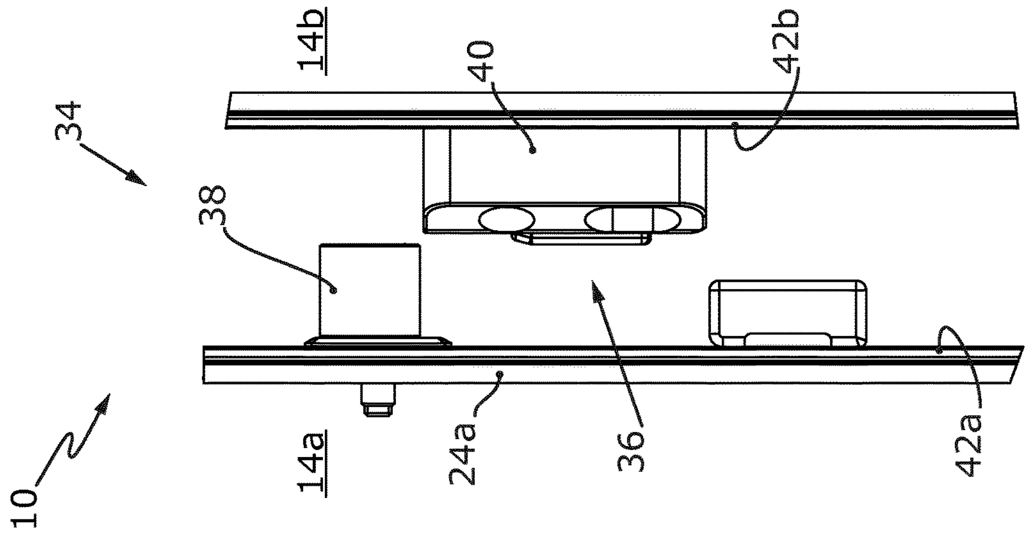
FIG. 2*a* shows a part of the fitting assembly according to FIG. 1, with a first leaf being in the blocking position and a second leaf being in the sliding position.

FIG. 2*a* shows a detail of the door 10 and the fitting assembly 34 in the region of the means 36 for securing against operating errors. The means 36 for securing against operating errors has a first projection 38 and a second projection 40. The first projection 38 is movably arranged on the first leaf 14*a*. In this case, the first projection 38 is preferably securely arranged on, in particular riveted to, the first connecting-rod assembly 24*a*. The first connecting-rod assembly 24*a* can be arranged under a first cover rail 42*a*. The first projection 38 may be in the form of a bolt. The second projection 40 is preferably securely arranged on the second leaf 14*b*, in particular on a second cover rail 42*b* and/or directly on the leaf profile. The second projection 40 may be cuboid.

FIG. 2*b* shows the door 10 according to FIG. 2*a*, the leaves 14*a*, 14*b* having been moved towards one another from their position in FIG. 2*a*. The first connecting-rod assembly 14*a* is in the blocking position. The first projection 38 can pass by the second projection 40 in this blocking position. In the present embodiment, the first projection 38 can pass by the second projection 40 vertically above the second projection 40.

It can also be seen from FIG. 2*b* that the fitting assembly 34 comprises a means 44 for securing against raising. The means 44 for securing against raising comprises a third projection 46. The third projection 46 may be cuboid. The third projection 46 can be securely arranged on the first leaf 14*a*. Here, the third projection 46 can in particular be fastened to the first cover rail 42*a* and/or directly to the leaf profile. The third projection 46 prevents the first leaf 14*a* from lifting up, since the third projection 46 abuts the second projection 40 in this case. The third projection 46 is therefore preferably arranged under the second projection 40. Particularly preferably, the second projection is arranged, in the vertical direction, between the first projection 38 and the third projection 46.

FIG. 2*c* shows the door 10 according to FIG. 2*a*, with the first connecting-rod assembly 24*a* not being in the blocking position, but in the sliding position. In this sliding position, the first projection 38 is located vertically, at the level of the second projection 40, such that, when closing the leaves 14*a*, 14*b*, the two projections 38, 40 meet at the end faces thereof, at least in part and in particular completely. This prevents the leaves 14*a*, 14*b* from closing any further as long as the first leaf 14*a* is not in the blocking position. Damage to the fitting assembly 34 owing to this incorrect actuation is prevented in this way.

In the sliding position of the first leaf 14*a* shown in FIG. 2*c*, the first connecting-rod assembly 24*a* can be actuated in order to transfer the first projection 38 into the blocking position, shown in FIG. 2*b*. By contrast, the first connecting-rod assembly 24*a* cannot be actuated in the blocking position shown in FIG. 2*b* with the leaves 14*a*, 14*b* pushed together, and therefore incorrect actuation of the first connecting-rod assembly 24*a* is eliminated.

The first projection 38 and/or the second projection 40 can comprise a buffer 48 in order to dampen the impact of the first projection 38 on the second projection 40.

Figure 3:
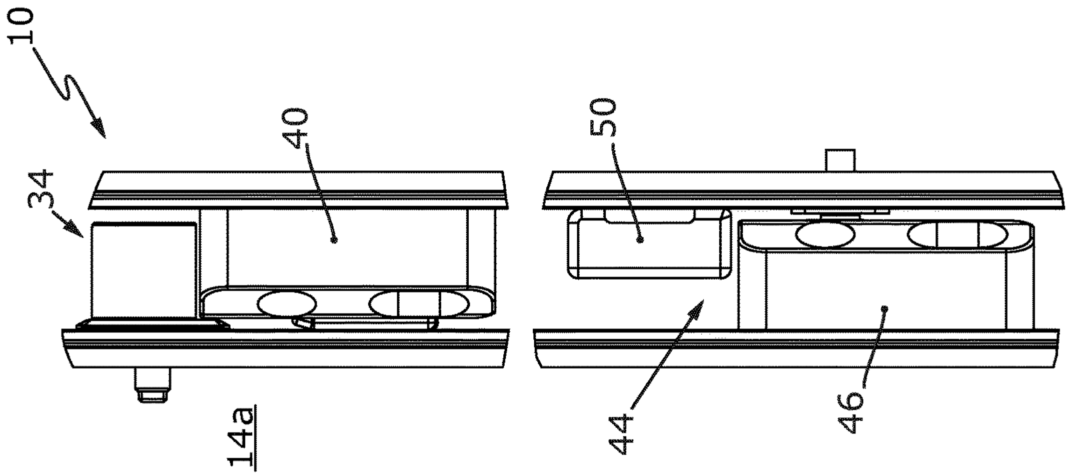
FIG. 3 shows another embodiment of a fitting assembly comprising a variant of a means for securing against raising, which is provided so as to be spatially separate from the means for securing against operating errors.

FIG. 3 shows another embodiment of a door 10 comprising a fitting assembly 34. The embodiment according to FIG. 3 corresponds to the embodiment described in FIGS. 1 to 2*c*. However, the third projection 46 is spaced apart from the second projection 40. Furthermore, the fitting assembly 34 comprises a fourth projection 50, which the third projection 46 abuts in an upward direction when the door 10 is closed, in order to form a means 44 for securing against raising for the first leaf 14*a*.

Figure 4:
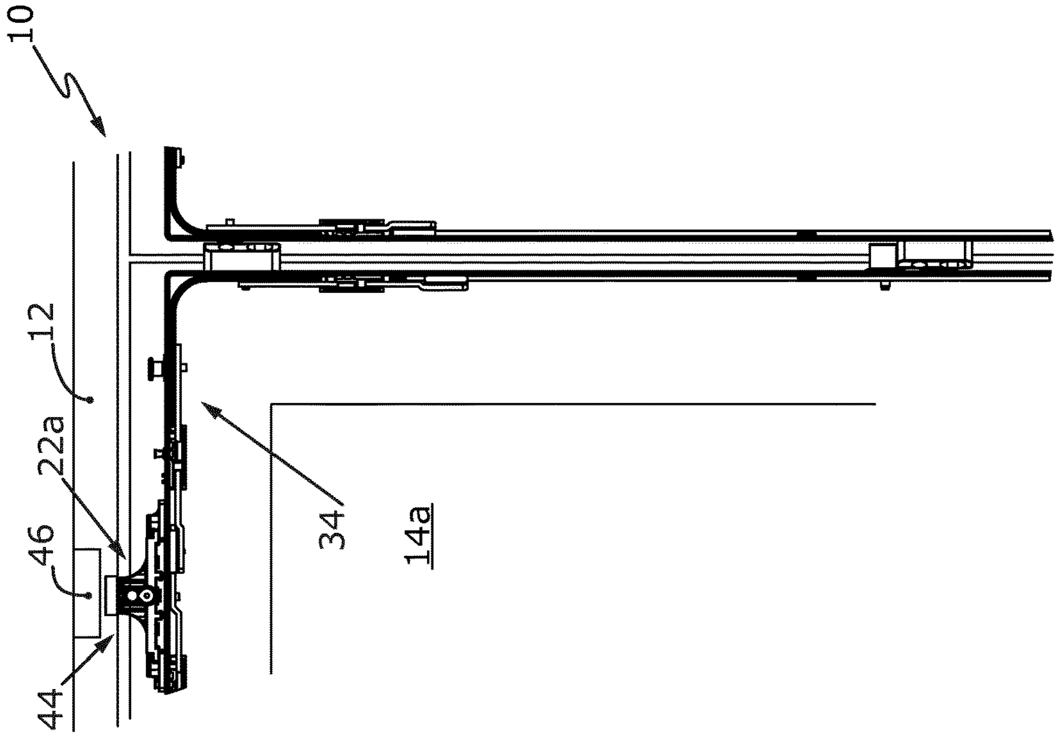
FIG. 4 shows another embodiment of a fitting assembly comprising another variant of a means for securing against raising, which is provided so as to be spatially separate from the means for securing against operating errors.

FIG. 4 shows another embodiment of a door 10 comprising a fitting assembly 34. The embodiment according to FIG. 4 corresponds to the embodiment described in FIGS. 1 to 2*c*. However, the third projection 46 is mounted on the fixed frame 12. Part of the fitting assembly 34, in particular a slider, in this case a slider 22*a*, vertically abuts the third projection 46 when the first leaf 14*a* lifts up and forms a means 44 for securing against raising as a result.

Figure 5:
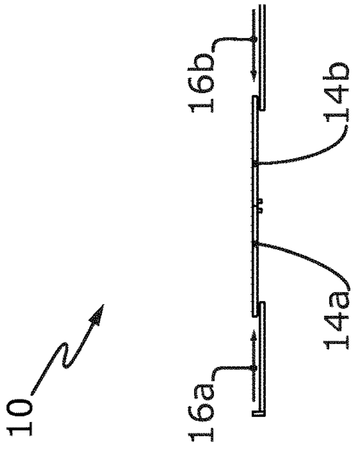
FIG. 5 is a schematic view of the arrangement of the leaves in FIG. 1.

FIG. 5 is a schematic view of the door 10 shown in FIGS. 1 to 2*c*. It is clear from FIG. 5 that the leaves 14*a*, 14*b* are arranged in the "C version" ("Schema C"). Preferably, the leaves 14*a*, 14*b* are arranged to run outwards in this case, as shown in FIG. 5. The action of sliding the two leaves 14*a*, 14*b* towards one another is indicated in FIG. 5 by the arrows 16*a*, 16*b* in the main plane of the door 10. FIG. 5 shows each of the leaves 14*a*, 14*b* in the blocking position. In order to open the leaves 14*a*, 14*b*, said leaves are moved outwards, preferably perpendicularly to the main plane of the door 10. The possible positions of the leaves 14*a*, 14*b* in this case are shown in FIGS. 6*a* to 6*d*.

Figure 6B:
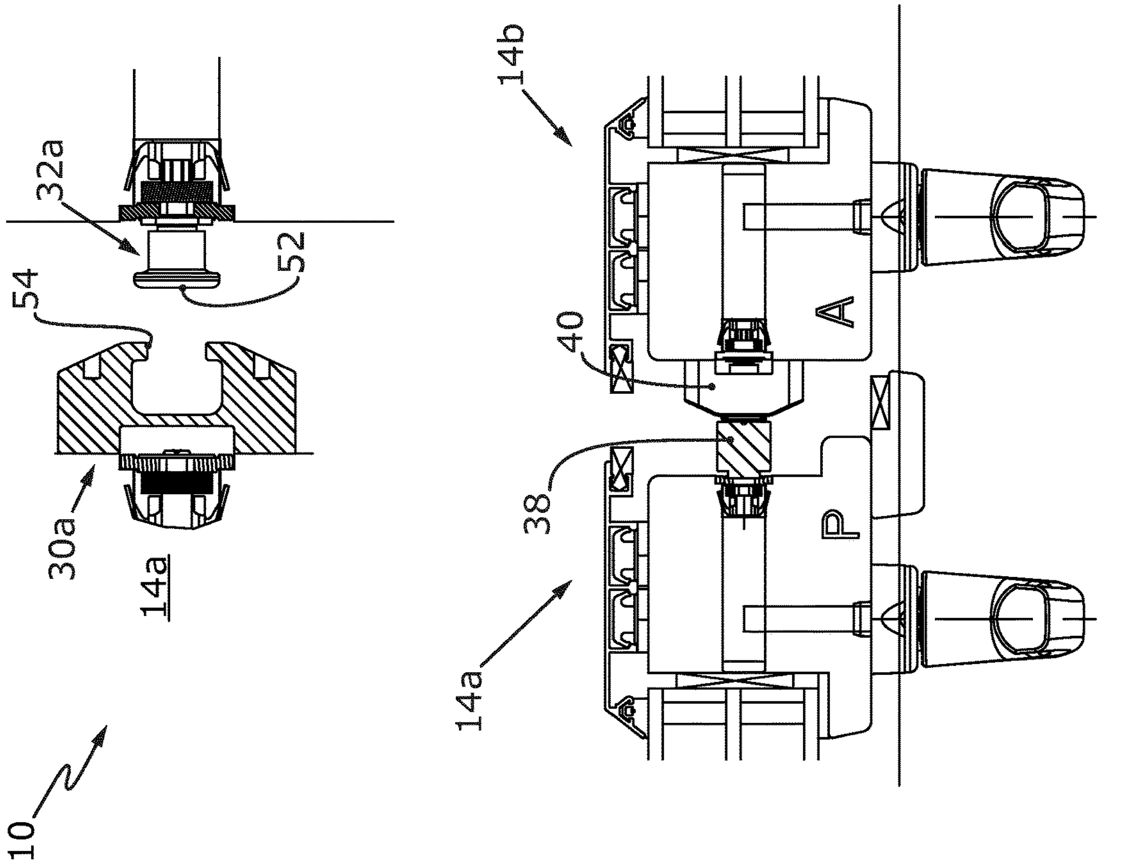
FIG. 6*b* shows sectional views of the leaves according to FIG. 6*a*, with both leaves being in the sliding position.
Figure 6A:
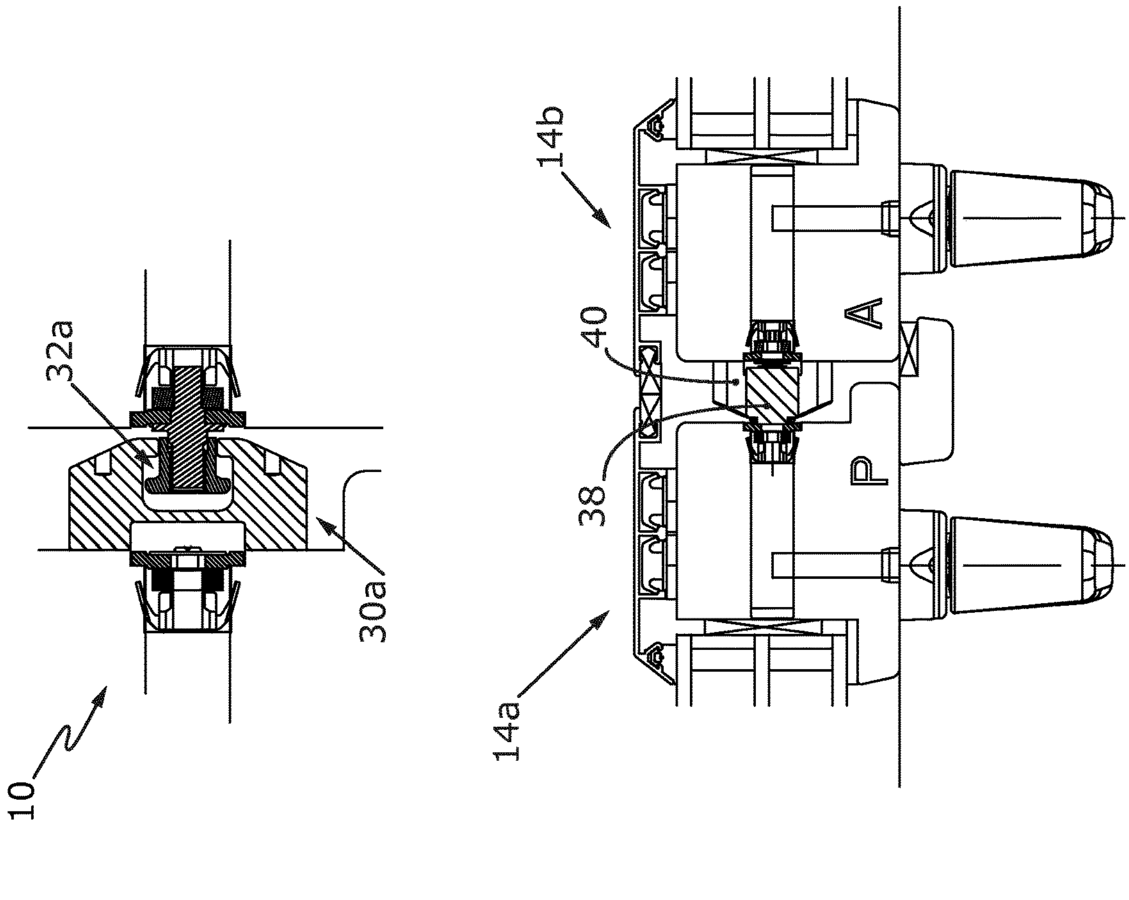
FIG. 6*a* shows sectional views of the leaves according to FIG. 1, with both leaves being in the blocking position.

FIG. 6*a* shows the door 10 with leaves 14*a*, 14*b* that are abutting one another at the end faces. The leaves 14*a*, 14*b* are both locked to one another in the blocking position, as can be seen from the locking cam 32*a* engaging in the locking striker 30*a*. The first projection 38 has passed by the second projection 40 such that the leaves 14*a*, 14*b* could approach one another.

FIG. 6*b* shows the door 10 according to FIG. 6*a*, with both the first leaf 14*a* and the second leaf 14*b* being in the sliding position. By contrast with the view according to FIG. 6*a*, a mushroom head 52 of the locking cam 32*a* does not engage behind a protrusion 54 of the locking striker 30*a*. The locking striker 30*a* is preferably arranged on the first leaf 14*a* such that the locking cam 32*a* can only move into and out of the locking striker 30*a* in the vertical direction. The first projection 38 abuts the second projection 40 at the end face, such that the leaves 14*a*, 14*b* cannot be moved further towards one another as long as the first leaf 14*a* is not in the blocking position.

Figure 6D:
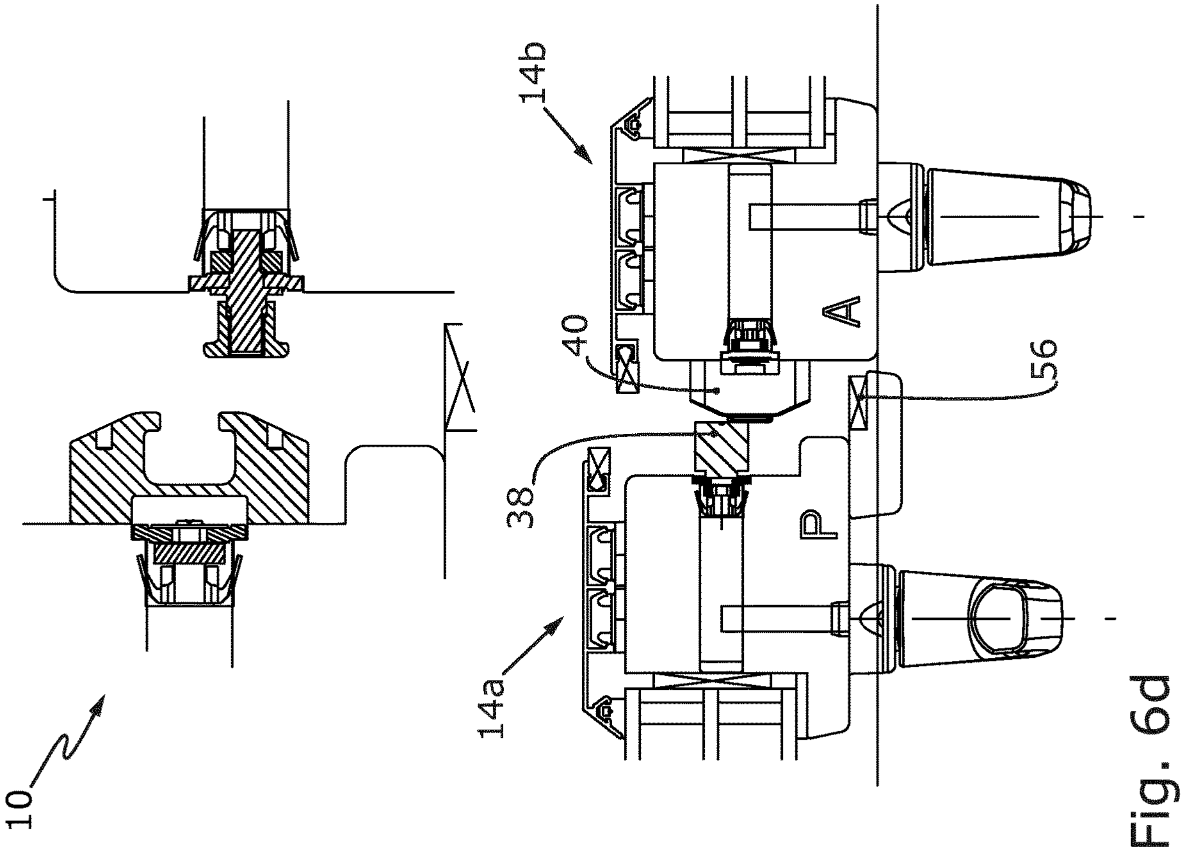
FIG. 6*d* shows sectional views of the leaves according to FIG. 6*a*, with the first leaf being in the sliding position and the second leaf being in the blocking position.
Figure 6C:
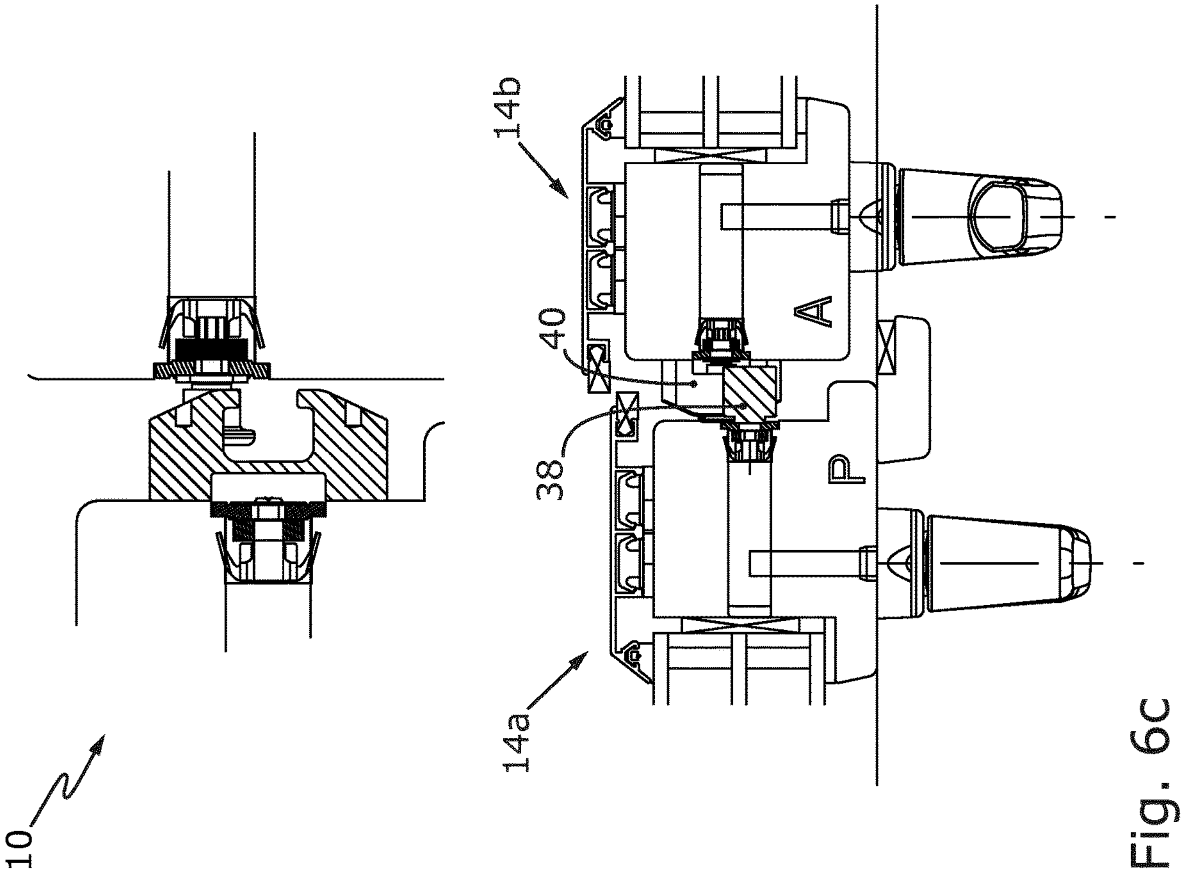
FIG. 6*c* shows sectional views of the leaves according to FIG. 6*a*, with the first leaf being in the blocking position and the second leaf being in the sliding position.

FIG. 6*c* shows the door 10, with the first leaf 14*a* being in the blocking position and the second leaf 14*b* being in the sliding position. Since the first projection 38 can pass by the second projection 40, the second leaf 14*b* can be readily transferred into the blocking position.

FIG. 6*d* shows the door 10, with the first leaf 14*a* being in the sliding position and the second leaf 14*b* being in the blocking position. The first projection 38 abutting the second projection 40 prevents the leaves 14*a*, 14*b* from being slid together any further. As a result, any damage to a seal 56 arranged between the leaves 14*a*, 14*b* is also prevented.

When considering all figures of the drawings together, the invention relates in summary to a fitting assembly 34 and to a window or door 10 comprising a fitting assembly 34 of this kind. The fitting assembly 34 comprises a means 36 for securing against operating errors. The means 36 for securing against operating errors has a first projection 38, which can be moved relative to a second projection 40, in particular vertically, by means of a first connecting-rod assembly 24*a*. A buffer 48 may be provided between the end faces of the first projection 38 and the second projection 40. The first projection 38 may be cylindrical and/or the second projection 40 may extend in an elongate manner in the vertical direction. More preferably, the fitting assembly 34 may comprise a means 44 for securing against raising comprising a third projection 46, which prevents the first leaf 14*a* from lifting up. The fitting assembly 34 preferably comprises a plurality of carriages 20*a*-20*d* and a plurality of sliders 22*a*-22*d*, in order to move leaves 14*a*, 14*b* of the window or door 10 in the sliding position thereof in parallel with the main plane of the window or door 10. In the blocking position, by contrast, the leaves 14*a*, 14*b* may be pressed against a fixed frame 12 of the window or door 10 by the fitting assembly 34 comprising a plurality of carriages 20*a*-20*d* and a plurality of sliders 22*a*-22*d*, in order to reliably seal the window or door 10.

LIST OF REFERENCE SIGNS

10 Door
12 Fixed frame
14*a* First leaf
14*b* Second leaf
16*a* Closing direction of the first leaf
16*b* Closing direction of the second leaf
18 Running rail
20*a*-20*d* Carriage
22*a*-22*d* Slider
24*a* First connecting-rod assembly
24*b* Second connecting-rod assembly
26*a* First handle
26*b* Second handle
28*a* First mechanism
28*b* Second mechanism
30*a*-30*d* Locking striker
32*a*-32*d* Locking cam
34 Fitting assembly
36 Means for securing against operating errors
38 First projection
40 Second projection
42*a* First cover rail
42*b* Second cover rail
44 Means for securing against raising
46 Third projection
48 Buffer
50 Fourth projection
52 Mushroom head
54 Protrusion
56 Seal

What is claimed is:

1. A fitting assembly (34) for two leaves (14*a*, 14*b*) of a window or door (10) that can be slid towards one another, the fitting assembly (34) comprising the following:

a) a first connecting-rod assembly (24*a*) for a first one of the leaves (14*a*), wherein the first connecting-rod assembly (24*a*) is configured to be moved into a sliding position, in which the first leaf (14*a*) can slide, and into a blocking position, in which the first leaf (14*a*) cannot slide;

b) a second connecting-rod assembly (24*b*) for a second one of the leaves (14*b*), wherein the second connecting-rod assembly (24*b*) is configured to be moved into a sliding position, in which the second leaf (14*b*) can slide, and into a blocking position, in which the second leaf (14*b*) cannot slide;

wherein the fitting assembly (34) comprises a first projection (38) on the first connecting-rod assembly (24*a*) and the fitting assembly (34) comprises a second projection (40) that is configured to be arranged on the second leaf (14*b*), and wherein the first projection (38) is configured to pass by the second projection (40) when the leaves (14*a*, 14*b*) are slid towards one another in the blocking position of the first connecting-rod assembly (24*a*) and is configured to collide with the second projection when the leaves (14*a*, 14*b*) are slid towards one another in the sliding position of the first connecting rod assembly so that the first projection prevents the two leaves from being completely slid together until the first connecting rod assembly is moved to the blocking position.

2. The fitting assembly according to claim 1, wherein the first projection (38) is bolt-shaped.

3. The fitting assembly according to claim 1, wherein the second projection (40) is configured to be fixedly arranged on the second leaf (14*b*).

4. The fitting assembly according to claim 1, wherein the first projection (38) and/or the second projection (40) comprises a buffer (48) on an end face thereof in order to dampen an impact of the first projection (38) on the second projection (40).

5. The fitting assembly according to claim 1, wherein the fitting assembly (34) comprises a third projection (46), which is configured to be arranged on the first leaf (14*a*) or a fixed frame (12) in order to secure the first leaf (14*a*) against lifting up.

6. The fitting assembly according to claim 5, wherein the third projection (46) engages under the second projection (40) when the leaves (14*a*, 14*b*) are closed.

7. The fitting assembly according to claim 1, wherein the fitting assembly (34) comprises a locking cam (32*a*-32*d*) that is arranged on the second connecting-rod assembly (24*b*) and a locking striker (30*a*-30*d*) that is configured to be fixedly arranged on the first leaf (14*a*) for receiving the locking cam (32*a*-32*d*) at least in part.

8. The fitting assembly according to claim 7, wherein the locking striker (30*a*-30*d*) comprises a protrusion (54) and the locking cam (32*a*-32*d*) comprises a mushroom head (52) for engaging under the protrusion (54) in the blocking position of the second connecting-rod assembly (24*b*).

9. A window or a door (10) comprising a fixed frame (12), two leaves (14*a*, 14*b*) that can be slid towards one another and a fitting assembly (34) according to claim 1, the fitting assembly being mounted on the leaves (14*a*, 14*b*).

10. The window or the door according to claim 9 wherein the second projection (40) is fixedly arranged on the second leaf (14*b*).

11. The window or the door according to claim 9 wherein the third projection (46) is fixedly arranged on the first leaf (14*a*).

12. The window or the door according to claim 9, wherein, i) in the sliding position of the first connecting-rod assembly (24*a*), the first leaf (14*a*) can be moved further outwards from the fixed frame (12) than in the blocking position of the first connecting-rod assembly (24*a*) and ii) in the sliding position of the second connecting-rod assembly (24*b*), the second leaf (14*b*) can be moved further outwards from the fixed frame (12) than in the blocking position of the second connecting-rod assembly (24*b*).

13. The window or the door according to claim 9, wherein the fitting assembly (34) comprises a first handle (26*a*) coupled to the first connecting-rod assembly (24*a*) and a second handle (26*b*) coupled to the second connecting-rod assembly (24*b*).

14. The window or the door according to claim 13, wherein the first handle (26*a*) comprises only two switch positions, the two switch positions consisting of a first switch position in which the first connecting-rod assembly (24*a*) is in the blocking position and a second switch position in which the first connecting-rod assembly (24*a*) is in the sliding position.

15. The window or the door or according to claim 13, wherein the second handle (26*b*) comprises only two switch positions, the two switch positions consisting of a first switch position in which the second connecting-rod assembly (24*b*) is in the blocking position and a second switch position in which the second connecting-rod assembly (24*b*) is in the sliding position.

* * * * *